Figure 1:
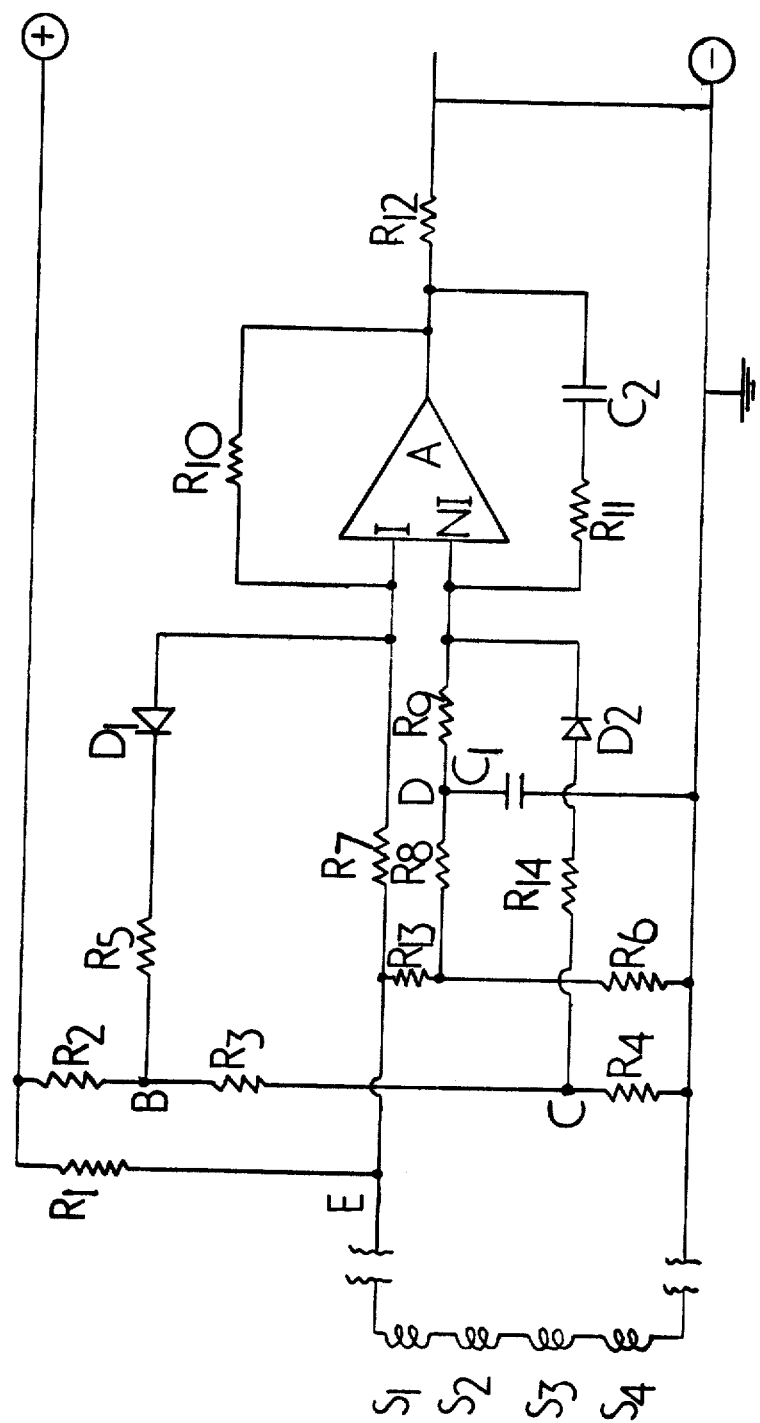

United States Patent
Higgens

[11] 3,893,035
[45] July 1, 1975

[54] AMPLIFICATION CIRCUIT

[75] Inventor: Kenneth Henry Higgens, Sutton Coldfield, England

[73] Assignee: Dunlop Limited, London, England

[22] Filed: Oct. 26, 1973

[21] Appl. No.: 409,931

[30] Foreign Application Priority Data
Nov. 4, 1972 United Kingdom............ 50915/72
May 19, 1973 United Kingdom............ 23980/73

[52] U.S. Cl............ 328/146; 307/235 R; 307/308; 328/1
[51] Int. Cl........................ H03k 5/20; H03k 5/18
[58] Field of Search............ 328/1, 146; 307/235 R, 307/308; 340/52 F, 58

[56] References Cited
UNITED STATES PATENTS

| | | | |
|---|---|---|---|
| 3,092,806 | 6/1963 | Field | 340/58 |
| 3,492,589 | 1/1970 | Rotier | 307/235 X |
| 3,657,660 | 4/1972 | Pfersch | 328/1 X |
| 3,665,387 | 5/1972 | Enabnit | 340/58 |
| 3,760,192 | 9/1973 | Darrow | 307/235 R |

Primary Examiner—John Zazworsky
Attorney, Agent, or Firm—Stevens, Davis, Miller & Mosher

[57] ABSTRACT

Amplification circuit, particularly suitable for use with a tire pressure reduction indication system, providing a pulsed output signal of predetermined frequency on receipt of a pulse input signal and a constant output signal for a change in D.C. voltage value of the input. The circuit may also include rejection means for rejecting input pulses below a certain amplitude, for rejecting changes in D.C. voltage level below a predetermined level or input pulses not having immediately preceding and following smaller pulses of opposite polarity.

4 Claims, 2 Drawing Figures

AMPLIFICATION CIRCUIT

This invention relates to amplification circuits. In particular it relates to a circuit which is sensitive both to transient (pulsed) voltage signals and to changes in steady voltages from one value to another, the circuit amplifying both these different types of voltage change.

The need for this circuit may arise in several situations and the present invention is not limited to any particular one. One example of such a need is in connection with the detection of the whole or partial deflation of a pneumatic tire and the particular embodiment of the present invention is described in connection with one such detection system as described in Provisional specification accompanying U.K. Application No. 31,619/72 filed on July 6, 1972, corresponding to U.S. patent application Ser. No. 374,665, filed June 28, 1973.

Briefly the system disclosed in the specification of the aforesaid U.K. Application No. 31,619/72 comprises, for each wheel and tire assembly, a pair of coils, a pressure switch and a permanent magnet. The first coil of each pair is mounted on the wheel in series with the pressure switch. Under normal operating conditions with the tire properly inflated the switch is open but on fall of tire pressure the switch closes to short-circuit the coil. The second, detector, coil of each pair is mounted on a fixed vehicle member associated with the wheel and has the permanent magnet positioned on its axis. If the tire pressure falls below a predetermined value the pressure switch closes so that a current pulse is induced in the first coil as it passes the magnet once per wheel revolution. This current pulse creates a magnetic field which in turn creates a pulse signal in the second, detector, coil. This signal comprises a single pulse of one polarity and two other pulses of smaller amplitude and opposite polarity, one immediately preceding and the other immediately following the single pulse, and is fed to an amplifying circuit the output of which is used to actuate a warning device e.g. a light, bell or buzzer to indicate the reduction of pressure to the driver. The present invention not only detects and amplifies the pulse signal but also detects and amplifies a change in the steady potential difference applied to the coils caused by the presence of a fault in the coil e.g. a break in the coil or a shorted coil.

The circuit of the present invention comprises amplifier means, means for providing a pulsed output signal of a predetermined frequency on receipt of a pulsed input signal and means for providing a constant output signal for a change in the D.C. voltage value of the input. Preferably the amplifier means comprises a differential amplifier. The pulsed input signal is not necessarily of the same frequency as the output signal from the amplifier means.

The circuit may also include means for rejecting input pulses below a certain amplitude and/or means for rejecting changes in the D.C. voltage level below a predetermined value, no output signal being obtained from the amplifier on such rejections.

Two embodiments of the invention will now be described by way of example with reference to the accompanying circuit diagrams, the first embodiment being shown in FIG. 1 and the second in FIG. 2.

The circuit of the first embodiment is connected to four detector coils $S_1$, $S_2$, $S_3$ and $S_4$ mounted one on each brake back plate or other fixed member associated with each wheel of the vehicle and are connected together in series. They are connected in series with a resistor $R_1$ to a potential source, e.g., the car battery, the resistance of $R_1$ and the coils being approximately equal so that point E in FIG. 1 is at a potential which is half the battery voltage with respect to earth.

The circuit includes an amplifier A which is a conventional differential amplifier (type $\mu$ A 741 supplied by various semi-conductor manufacturers, e.g., Newmarket Limited or Mullard Limited) and has the characteristics that for a small change in potential difference between its two input terminals a large output signal can be produced the value of which is substantially independent of the value of said input potential difference. The amplifier has two output conditions: "high" and "low" depending on which of the input terminals is at a higher potential.

The total voltage at point E will be applied to the inverting (I) and non-inverting (NI) inputs via resistor $R_7$ and via resistor $R_{13}$ $R_8$ and $R_9$ respectively. The voltage drop across resistance $R_{13}$ will cause the NI input to be at a lower potential than the I input with respect to earth. In the absence of a transient or pulse signal induced in any one of the coils $S_1$ to $S_4$ the amplifier output will therefore be in its low condition (near earth potential). The capacitor $C_1$ will charge up so the potential point D will be approximately the same potential as the NI input.

When a transient or pulse signal appears at point E it will be applied to the I input of the amplifier via resistance $R_7$ but will be absorbed by a capacitor $C_1$ and will not appear at the NI input. If the pulse signal induced in any of the coils $S_1$ to $S_4$ is due to deflation of the tire rather than to some spurious effect the negative going signal at point E exceeds the voltage across resistance $R_{13}$ so that the amplifier output voltage will be changed instantaneously to its high condition near the positive supply value across resistance $R_{12}$. This output voltage is applied to the NI input at the amplifier via capacitor $C_2$ and resistor $R_{11}$ and this will hold the amplifier in its high output condition after the input transient or pulsed signal has ceased. The amplifier will be held in this high output condition until the capacitor $C_2$ is fully charged at which point the amplifier will revert to its low output condition. The amplifier will be held in this low condition until capacitor $C_2$ has discharged regardless of input signals but will revert to its high output condition on receipt of the next transient input signal after $C_2$ has discharged. Thus for a continuous series of input signals the amplifier will produce a series of output pulses the duration of each of which is independent of the duration and frequency of the input signals. However, once the input signals cease, e.g., on the vehicle being stopped, the production of the output pulses also ceases.

If the steady D.C. voltage at point E is reduced by reduction of the resistance of the coils due to one or more of them being shorted out this voltage level will be applied to both I and NI inputs of the amplifier. If this voltage falls below the potential of point C (set by the resistor chain $R_2$, $R_3$ and $R_4$) then the potential of the NI input will be maintained and the I input will fall below the NI value. This potential difference between the two amplifier input terminals will cause the amplifier output to change to its high output condition across $R_{12}$.

If the steady voltage at point E rises due to an increase in the resistance of the coils $S_1$ to $S_4$ due to a break, i.e., open circuit both amplifiers inputs will tend to rise until the potential of point B is reached determined by resistors $R_2$, $R_3$ and $R_4$. Above this value the potential of the I input will be maintained but the NI input potential value will rise above it. This will cause the amplifier output to change to its high output condition across the resistor $R_{12}$.

Thus for a positive or negative change in the value of the potential at point E above a certain value (thereby eliminating small spurious changes) the amplifier produces a steady amplified output signal which is then supplied to a light or audible device (e.g., a bell or a buzzer). Thus for a tire deflation condition a discontinuous alarm is produced and for a fault in one or more of the coils a continuous alarm is produced.

For a typical system to be installed in a car having a 12 volt battery supply and coil resistances of approximately 200 ohms each the following values of the various resistors, capacitors, etc., of the circuit shown in the accompanying diagram have been found to be suitable.

| Component Values | | | |
|---|---|---|---|
| $R_1$ | — | 800 | ohms |
| $R_2$, $R_3$ | — | 1 | k ohms |
| $R_4$ | — | 1.7 | k ohms |
| $R_5$, $R_7$, $R_9$, $R_{14}$ | — | 4.7 | k ohms |
| $R_6$ | — | 10 | k ohms |
| $R_8$ | — | 47 | k ohms |
| $R_{10}$ | — | 1 | M ohms |
| $R_{11}$ | — | 10 | k ohms |
| $R_{12}$ | — | 2 | k ohms |
| $C_1$ | — | 0.47 | $\mu F$ |
| $C_2$ | — | 1.0 | $\mu F$ |
| $D_1$, $D_2$ | — | Type 1 S 920 or equivalent | |
| A | — | Type $\mu A$ 741 | do. |

It has been found that the circuit of the first embodiment and illustrated in FIG. 1 whilst adequate for a limited range of vehicle speed suffers from the disadvantage that, if the circuit is adjusted to detect signals at the lower speeds, at the higher speeds the rotation of the steel mass of the wheel, etc., can induce a sufficiently large signal in the detector coil or coils of the system whereby the circuit creates an output signal which actuates the warning device, e.g., the light, bell or buzzer, to indicate loss of tire pressure when in fact no such loss has occurred. The speed at which these unwanted signals occur depend on the actual coil size and geometry and on the particular vehicle. The relative terms "high speed" and "low speed" cannot therefore be strictly defined.

The circuit of the second embodiment was devised in order to reduce or eliminate the above disadvantage and comprises means for providing a pulsed output voltage signal of a predetermined frequency on receipt of an input voltage signal having immediately preceding and following smaller voltage signals of opposite polarity to the said input voltage signals.

The circuit includes means for rejecting input pulses not having immediately preceding and following smaller voltage signals of opposite polarity, no output signal being obtained from the amplifier on such rejections, since it should be appreciated that spurious pulses created by rotation of the mass of the wheel are of alternate polarity and of equal amplitude whereas as indicated above a signal indicative of true pressure loss comprises a pulse of one polarity immediately preceded and followed by pulses of opposite polarity and smaller amplitude.

Figure 2:
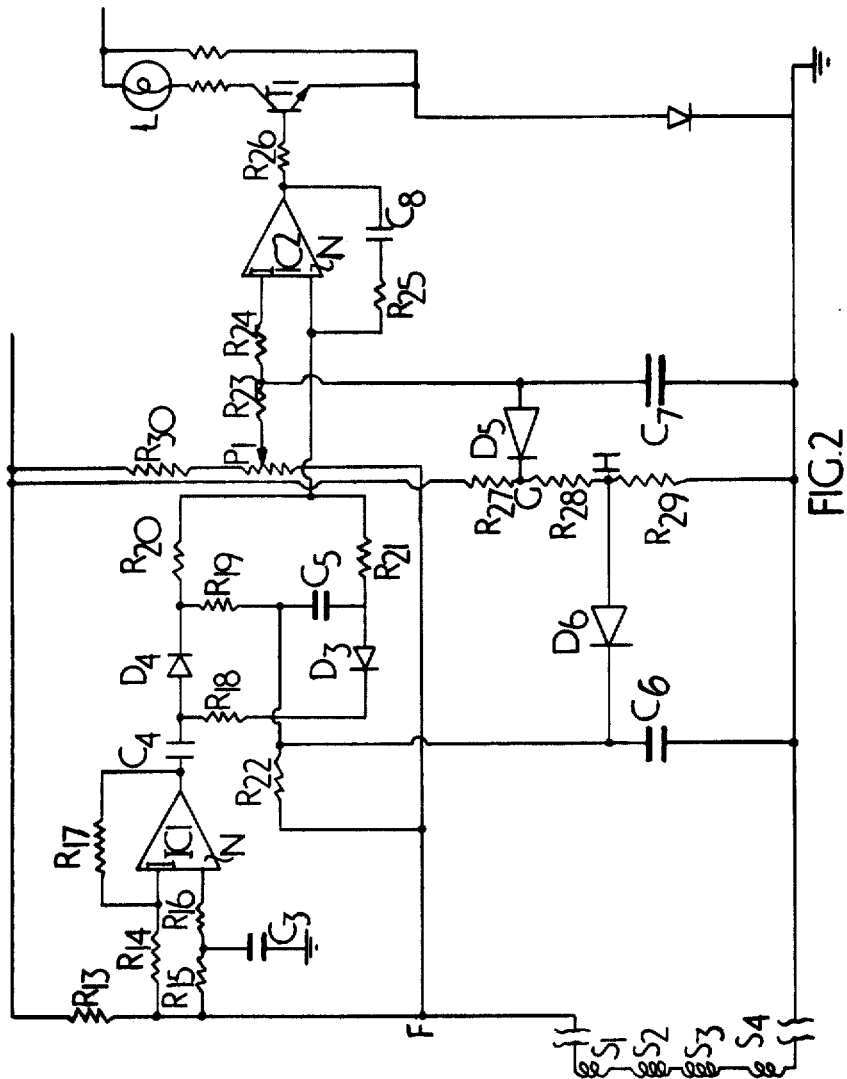

The circuit illustrated in FIG. 2 comprises a preamplification stage, a discrimination circuit and an output amplification and detection circuit. The last stage is substantially similar to the circuit of the first embodiment shown in FIG. 1.

The amplitude of the signal arising both from pressure loss and from the rotation of the wheel mass increases as a power of the rotational speed and at the lowest speed, amplification is needed to forward bias the diodes of the discriminator. Thus the necessity for the preamplification stage. As the rotational speed increases the amplitude of the signal becomes sufficiently large to saturate the preamplifier.

The "common zero" voltage of the preamplifier is obtained by connection of the four coils $S_1 S_2 S_3$ and $S_4$, mounted one on each brake back plate or other fixed member associated with each vehicle wheel and in series with a resistor $R_{13}$ to a potential source, e.g., the vehicle battery. A proportion of the supply voltage from the potential source is thus applied across the four coils and the required D.C. voltage level at point F in the FIG. 2 is obtained. This voltage is such that the first and third pulses of a pulse signal induced in one of the coils $S_1 - S_4$ due to pressure loss will drive the differential amplifier IC1 into saturation at a lower amplitude than the second pulse of opposite polarity. Thus on both linear (non-saturated) and saturated modes of operation the pre-amplification stage maintains the asymmetry of the pressure loss signal. The gain of the amplifier IC1 is arranged by suitable choice of the value of resistor $R_{17}$ to be such that the signal arising from wheel rotation does not saturate the amplifier and so retains the symmetry of the pulse signal (i.e., equal amplitude pulses of opposite polarity).

The D.C. level at point F and any superimposed pulse signal induced in any one of the coils $S_1 - S_4$ are fed to the inverting input I of amplifier IC1 via resistor $R_4$. The D.C. level and superimposed signal are fed to the non-inverting input N via the filter network of resistors $R_{15}$ and $R_{16}$ and capacitor $C_3$. The filter network suppresses the pulse signal so that the D.C. level only appears at the non-inverting input N and the pulse signal thus appears as a difference between the two inputs I and N of the amplifier IC1. The amplified and inverted signal is fed via the capacitor $C_4$ to the discriminator stage.

The amplitude of the pressure loss signal increases with wheel speed and when it increases beyond a certain value the second, positive-going pulse will cause the amplifier IC1 to saturate. With further increase of wheel speed the negative-going first and third pulses cause saturation.

In the fully saturated condition the amplifier output will produce a series of "squared" pulses with the amplitude of the second (positive-going) pulse exceeding the amplitude of the other two pulses. Thus in the linear mode, (small signals and very low speeds) in the saturated mode, (large signals and large speeds), and in the intermediate condition, (when the second pulse causes saturation but the first and third pulse do not), essential asymmetry of the signal wave form is maintained.

In case of no pressure loss the signal induced in the coil(s) $S_1 - S_4$ will be repetitive and the amplitudes of the positive and negative-going pulses will be equal and thus symmetrical about the common zero D.C.

level at F. The amplitude at maximum wheel speed will not be sufficient to saturate the amplifier IC1. The signal will thus be amplified undistorted and will remain symmetrical.

The discriminator stage depends for its operation on the asymmetric form of the pressure loss signal compared with the symmetric form of the signal arising from wheel rotation.

The negative-going first and third pulses of a pressure loss signal after amplification by the preamplification stage are fed via resistor $R_{18}$ and diode $D_3$ to charge capacitor $C_5$ so that the potential of the capacitor due to these first and third pulses is approximately equal to the peak pulse voltage. This potential is applied via resistor $R_{22}$ to the non-inverting input of the differential amplifier IC2 of the output stage to provide a bias to inhibit the switching action of the output stage. The positive-going second pulse of the pressure loss signal is also fed via diode $D_4$ and resistor $R_{20}$ to the non-inverting input N of the amplifier IC2 in opposition to the bias voltage. Being of larger amplitude than the first pulse the second pulse overcomes the bias voltage and initiates a switching action in the output stage. Thus the true pressure loss signal, because of its asymmetric form produces a triggering of the output stage.

The combined signal to the non-inverting input N of the amplifier IC2 is superimposed upon the D.C. voltage applied across the coils $S_1 S_2 S_3$ and $S_4$ by the connection through resistor $R_{22}$. The capacitor $C_6$ filters out the signal induced in the coil(s) to prevent interference with the (inverted) output from amplifier IC1.

The D.C. voltage across the coils $S_1 S_2 S_3$ and $S_4$ is also applied as a D.C. level to the inverting input I of amplifier IC2 via resistors $R_{23}$ and $R_{24}$ and a potentiometer $P_1$ which provides an adjustable fixed bias to set the working point of amplifier IC2. The capacitor $C_7$ also filters out pulse signals induced in the coil(s) $S_1 - S_4$.

In the case of no pressure loss the signal induced in the coil(s) $S_1 - S_4$ and amplified by amplifier IC1 will be of symmetrical form about the common zero and so the peak voltage produced across resistor $R_{19}$ will not exceed the potential developed across capacitor $C_5$ and so the amplifier IC2 will not be triggered, in contrast to the triggering as a result of a true pressure loss signal.

Thus when a true pressure loss signal is induced in the coil(s) $S_1 - S_4$ the positive second pulse will exceed the signal bias on capacitor $C_5$ and the preset bias on potentiometer $P_1$ and will cause the output of amplifier IC2 to switch to the high condition. This output will feed back via resistor $R_{25}$ and capacitor $C_8$ to maintain the high output condition for a period determined by the time constant of resistor $R_{25}$ and capacitor $C_8$. The output from amplifier IC2 will also drive the indicator drive transistor $T_1$, via resistor $R_{26}$, the indicator in this embodiment comprising a lamp L.

If the coil circuit becomes open circuit for example, due to a break in one of the coils $S_1 - S_4$, the potential at point F will rise and approach the whole supply potential. The potential of both inputs of amplifier IC2 will tend to rise but the inverting input I will tend to be held down to the potential at point G set by resistor chain $R_{27}$, $R_{28}$ and $R_{29}$ due to the connection via diode $D_5$. This will cause the output of amplifier IC2 to switch to a continuous high output condition.

If one of the coils becomes shorted the potential of point F will fall tending to lower the potential of both inputs of amplifier IC2. The potential of the non-inverting input N will tend to be held to the potential of point H set by resistors $R_{28}$ and $R_{29}$ due to the connection via diode $D_6$. This again will cause amplifier IC2 to switch to a continuous high output condition.

For a typical circuit to be installed in a car having a 12 volt battery supply and coil resistance of approximately 200 ohms each, the following values of the various components shown in the accompanying diagram have been found to be suitable.

| Component Values | | | |
|---|---|---|---|
| $R_{13}$ | — | 1 | k ohm |
| $R_{14}$ | — | 20 | k ohm |
| $R_{15}$, $R_{16}$ | — | 10 | k ohm |
| $R_{17}$ | — | 2.2 | M ohm |
| $R_{18}$, $R_{19}$ | — | 2.2 | k ohm |
| $R_{20}$ | — | 27 | k ohm |
| $R_{21}$ | — | 22 | k ohm |
| $R_{22}$, $R_{23}$, $R_{24}$ | — | 10 | k ohm |
| $R_{25}$ | — | 22 | k ohm |
| $R_{26}$ | — | 2.2 | k ohm |
| $R_{27}$ | — | 680 | ohm |
| $R_{28}$ | — | 390 | ohm |
| $R_{29}$ | — | 910 | ohm |
| $R_{30}$ | — | 4.7 | k ohm |
| $P_1$ | — | 100 | ohm |
| $C_3$ | — | 1 | μF |
| $C_4$ | — | 2.2 | μF |
| $C_5$ | — | 100 | μF |
| $C_6$ | — | 1000 | μF |
| $C_7$ | — | 47 | μF |
| $C_8$ | — | 2.2 | μF |
| $D_3 - D_6$ | — | Signal diodes | |
| IC1 and IC2 | — | Type μA 741 or equivalent | |

Having now described our invention, what we claim is:

1. Apparatus for detecting pulse signals from pulse generating means, comprising: differential amplifying circuit means for generating an output signal having one of two possible voltage levels depending upon the voltage difference of input signals applied to said amplifying means, said amplifying means having first and second input terminals coupled to each other through a voltage dividing circuit to create a constant potential difference between said input terminals; and a filter circuit coupled to one of said input terminals to substantially inhibit pulse signals from being applied to said one input terminal; said amplifying means output signal changing its voltage level when a pulse signal appears at the other of said input terminals, the negative peak of said pulse signal exceeding the constant potential difference between said first and second input terminals.

2. The apparatus according to claim 1, further comprising: means for detecting a change in level outside a preset range of the voltage applied to said first and second input terminals to create said constant potential difference, including first and second oppositely biased diodes coupled through respective voltage dividing circuits to said first and second input terminals of said differential amplifying circuit means, respectively.

3. The apparatus according to claim 1, further comprising circuit means for controlling the duration of the change in voltage level at the output of said differential amplifying circuit means, including capacitive and resistive impedance means coupled in series with each other between the output of said differential amplifying circuit means and said one input terminal of said amplifying means.

4. The apparatus according to claim 1, further comprising means for passing to said differential amplifying circuit means only those pulse signals having immediately preceding and following pulses of opposite polarity to and smaller amplitude than the main pulse signal, including a preamplifier circuit having its input coupled to said pulse signal generating means and a discriminator circuit having its input coupled to an output of said preamplifier circuit and its output coupled to said differential amplifying circuit means.

* * * * *